United States Patent Office 2,713,286
Patented July 19, 1955

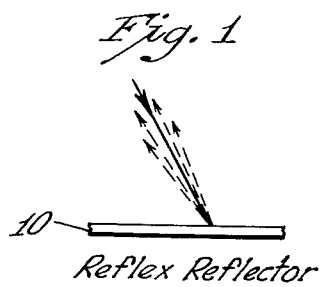
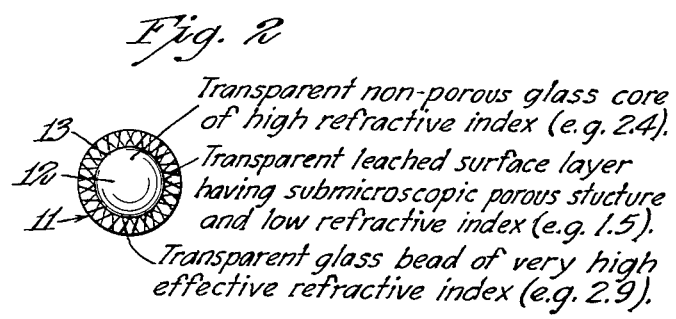
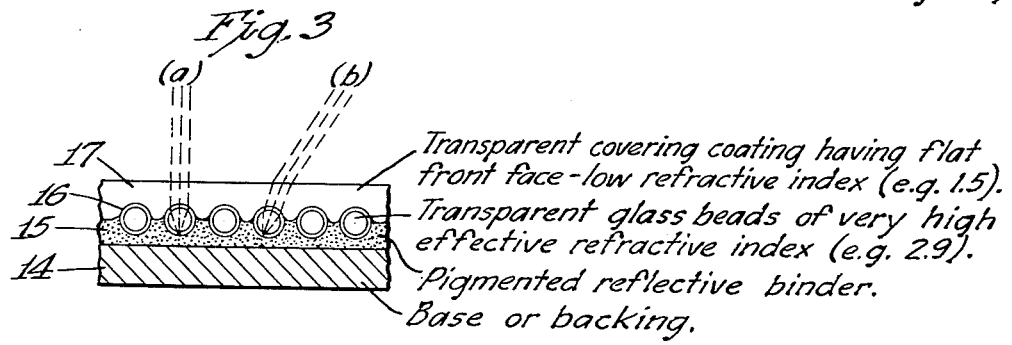
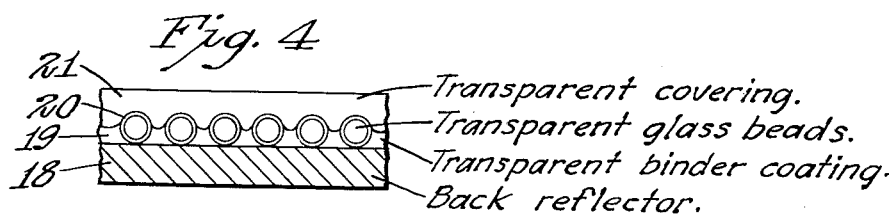
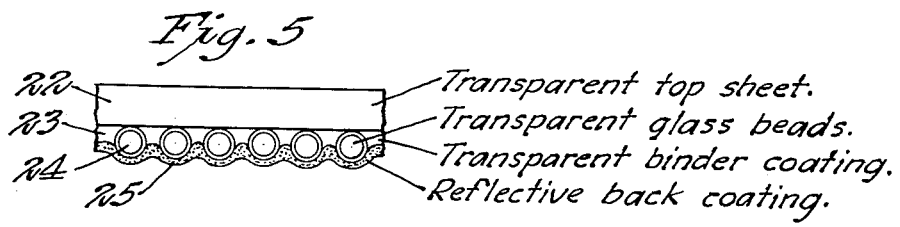

2,713,286

REFLEX LIGHT REFLECTORS AND GLASS BEAD ELEMENTS THEREOF

Nelson W. Taylor, White Bear Lake, Minn., assignor to Minnesota Mining & Manufacturing Company, St. Paul, Minn., a corporation of Delaware Application October 22, 1949, Serial No. 123,024

4 Claims. (Cl. 88—82)

This invention relates to an improvement in reflex light reflectors of a class described in the patent of P. V. Palmquist, B. S. Cross and G. P. Netherly, No. 2,407,680, issued on September 17, 1946. The improvement involves the use of a novel type of transparent glass beads of very high effective refractive index (e. g. 2.9), employed as sphere-lens elements. The invention also relates to these transparent glass beads, per se, as new and useful articles of manufacture.

Reflex reflectors of the class to which this invention relates may be broadly characterized as having a monolayer of small transparent sphere-lens elements of very high refractive index, an underlying light-reflective layer or surface which is optically and physically united to the back extremities of the lens elements, and an overlying transparent coating covering the layer of lens elements, which coating has a flat front face. Very small, transparent, glass spheres (sphericles) can be used and are commonly referred to as small glass beads.

The ratio between the effective refractive index of the spheres and the refractive index of the transparent covering coating should be in the range of about 1.6 to 2.0, the optimum value being about 1.9. The monolayer of glass spheres comprises thousands of beads per square inch, the beads having a diameter in the range of about 1 to 10 mils (i. e. 0.001 to 0.01 inch). Even smaller beads can be used.

The characteristic of such a reflector in returning back a brilliant cone of light toward the source of an angularly incident beam of light, gives rise to the term "reflex" reflector, to distinguish from mirrors which cause specular reflection, and from diffusing types of reflective surfaces which dissipate the incident light in all directions without selective return in the direction of incidence (as is the case with ordinary signs and markers). Road signs and markers of the reflex type have greater visibility at night than do ordinary signs and markers, to the occupants of an approaching vehicle, because less of the reflected light is dissipated outside of the field of viewing, the reflected light being concentrated in a narrow cone which automatically returns toward the headlights and occupants of the vehicle (see Fig. 1).

The elements of the reflex reflector structure constitute a catadioptric combination which both refracts and reflects the light. The particular optical and visual properties can be widely varied by employing different design arrangements as is pointed out in some detail in the aforesaid Patent No. 2,407,680.

A particularly advantageous type of structure is that described in connection with Fig. 5 of said patent, wherein the sphere-lens elements are in direct contact with and partially embedded in an underlying reflective binder layer (which may be coated upon a base or backing). In order to secure maximum reflection brilliancy with this type of reflector, the effective refractive index of the sphere-lens elements should be about 1.9 times the refractive index of the overlying transparent coating. As transparent top coatings made from commercially available and suitable compositions have a refractive index of the order of 1.5, this means that the sphere-lens elements should have an effective refractive index of the order of 2.9. The high magnitude of this value can be appreciated from the fact that ordinary glasses (including ordinary optical glasses) have refractive indices in the range of about 1.5 to 1.65. The desired effective refractive index is substantially higher than that of diamonds (i e. higher than 2.4).

In the aforesaid patent, it is proposed to meet this difficulty by employing a glass sphere of intermediate refractive index which is provided with a transparent, concentric, spherical, surface layer having a lower refractive index, as is illustrated in Fig. 4 thereof. This surface layer serves to space the glass sphere from the underlying concave reflective surface and from the overlying transparent covering coating. By employing the optimum thickness for the surface layer of the glass sphere, the incident light rays will be brought to a "focus" at the reflective surface and maximum reflex-reflection brilliancy will be secured both for normally incident light beams and for angularly incident light beams, due to the concentric concave surface of the reflective layer associated with each sphere. This structure combines what is known as "wide angularity" with high reflection brilliancy. The composite two-element sphere-lens has an effective refractive index greater than that of the glass sphere core, since it is the functional equivalent of a homogeneous sphere having a higher index value.

The aforesaid patent proposes to obtain the desirable type of structure (illustrated in Fig. 4 thereof) which has just been indicated, by coating the glass beads, prior to use in making the reflector, in such a manner as to provide each bead with a transparent concentric, spherical coating of the desired thickness. It has been found as a practical matter that it is extremely difficult to properly coat the glass beads to secure this result by any commercially feasible procedure. The beads are of minute size (1 to 10 mils diameter). A cubic foot of 10 mil beads will contain about two thousand million (two billion) of such beads, while a cubic foot of one mil beads will contain about two million million (two thousand billion) beads. For best results, the coating should be of uniform thickness on each bead so as to provide a concentric outer surface, and there should not be a wide variation in coating thickness as between the beads. The thickness of the coating should approximate the optimum value required by the optical considerations. The difficulty of meeting this requirement will be evident from the fact that a variation in the coating thickness of as little as $10^{-5}$ in. has a significant effect on optical properties (i. e., the effective refractive index) in the case of beads of 2 mils diameter or less. The beads must be coated in such a way as to obtain a solid, transparent coating on each bead without causing agglomeration of the beads due to sticking together during the making procedure. The process must be capable of practice under factory production conditions and must not be unduly costly. No commercially desirable solution of this problem has been found so far as I am aware.

According to my invention, use is made of transparent glass beads which have a transparent non-porous glass core of high refractive index surrounded by an integral concentric porous solid surface layer of substantial thickness which is transparent and of lower refractive index than the core glass, the core and the layer both serving as spherical lens elements of the composite two-element sphere-lens, the effective refractive index of the beads being substantially higher than that of the core glass. The porous structure of the surface layer is permeated by a medium of lower refractive index, which may be air or a transparent impregnant liquid or solid material. The thickness of the surface layer is a minor fraction of the diameter of the core.

I have discovered that a suitable porous surface layer can be formed by a chemical leaching treatment of the glass beads by which a soluble component of the surface region is extracted, as contrasted with the application of extraneous coating material. Thus the desired end result is obtainable by a subtractive procedure, instead of by an additive coating procedure such as is proposed in the aforesaid patent. My procedure permits of a much closer control of the thickness of the surface layer formed on the beads.

The leached surface layer of a glass bead has a reduced refractive index because it is porous and is permeated by a substantial proportion by volume of air or of an impregnant liquid or solid material of relatively low refractive index. The refractive index of air is unity. The residual solid component of the porous layer may have a somewhat higher or lower refractive index than that of the original glass, but in any event the substantial reduction of the bulk refractive index of the layer is obtained because the presence of air (or low-index transparent impregnant) within the porous structure makes the average refractive index lower than that of the original glass and lower than that of the residual solid component of the layer. The air-filled or impregnated pores are of submicroscopic size and the composite layer has sufficient homogeneity in the optical sense to be transparent. This is an essential point, since the diffusion of light rays caused by scattering in an optically non-homogeneous layer would tend to nullify the desired optical action in securing reflex reflection of high brilliancy.

The seemingly paradoxical result of increasing the effective refractive index of a glass bead by decreasing the refractive index of the outer portion of the bead, can be explained by an analysis of the effect of this alteration on the optical refraction of light rays passing into the bead and being successively refracted in going through the series of spherical interfaces between the media of differing refractive indices.

The effective refractive index of the modified glass beads can be directly measured by optical methods employed for determining the refractive indices of glass beads.

As has been indicated, the optimum effective refractive index for sphere-lens elements to be employed in the wide-angularity type of reflex reflector previously described, is approximately 2.9. My invention makes possible the utilization of glass beads having an effective refractive index of this magnitude, which can be manufactured by satisfactory commercial procedures and which perform satisfactorily in reflex reflector products suited for outdoor use. Further details will be given in connection with the description of the accompanying drawings, wherein:

Fig. 1 shows in diagram form a reflex reflector 10 and the concentrated cone of reflex-reflected light returning toward the source of an angularly incident ray or beam which produces it.

Fig. 2 is a greatly enlarged cut-away diagram of a glass bead having a porous leached surface layer, the latter being shown in section.

Figs. 3, 4 and 5, are magnified diagram views showing the cross-sectional structures of three different illustrative species of reflex reflectors embodying the invention. These diagrammatic drawings are not literal section views since the beads are spaced farther apart than is customary and are shown as though arranged in rows, whereas in normal practice the beads are in packed relation.

Referring to Fig. 2, there is shown an illustrative transparent glass bead 11, of the two-element sphere-lens type to which this invention relates, consisting of a transparent non-porous glass core 12 of high refractive index (e. g. 2.4) which is surrounded by an integral porous surface layer 13 of low refractive index (e. g. 1.5) which can be formed by leaching the surface portion of the original glass bead. The pores may be impregnated with a transparent liquid or solid material of relatively low refractive index, but the term "porous" is still applied as a characterization of the structural nature of the layer and to distinguish it from the core. The porous layer has a thickness which is a minor but plural-percent fraction of the diameter of the core (e. g. 15%). The core and the surface layer both serve as transparent lens elements of the composite sphere-lens.

This porous surface layer has a submicroscopic porous structure, the pores being so minute in diameter that, even when filled with air, the layer is transparent. The layer is optically homogeneous in that light is transmitted therethrough without appreciable ray scattering. This is in contrast to glass surfaces which have been etched or sand blasted, resulting in a frosted or diffusing type of surface layer which scatters incident light rays. A lens having the latter type of surface is not transparent and cannot function properly since the light-scattering effect serves to prevent the desired refraction of transmitted rays.

The effective refractive index of the present type of transparent glass beads (having a porous surface layer of lower refractive index than the core glass) is determined by the respective refractive indices of the core and of the surface layer, and by the thickness of the surface layer relative to the size of the bead. The equation for this relationship is quite complicated, especially as account must be taken of spherical aberration in deriving it. There is the added complication that the surface layer is not strictly uniform in composition and structure from its outer surface to the glass core.

As a practical matter it is much more convenient to directly correlate the leaching treatment in relation to the measurable effective refractive index of the finished glass beads. This can be easily done by varying the extensiveness of the leaching treatment on a series of samples, and then determining the effective refractive indices of the samples. Or, instead of actually measuring the refractive indices of the leached beads, the bead samples can be made up into reflex reflector samples and the respective reflection brilliancies thereof can be measured. In this way the optimum leaching treatment can be determined and a direct correlation can be obtained between variations in the leaching treatment conditions and the brilliancy of the reflex reflector.

As previously mentioned, the optimum effective refractive index of the treated glass beads is about 1.9 times the refractive index of the overlying covering coating of the reflex reflector. If the latter has a refractive index of 1.5, then the optimum effective refractive index of the beads will be about 2.9. The useful refractive index ratio range is about 1.6 to 2.0, which means that the corresponding range for the absolute effective refractive indices of the beads is about 2.4 to 3.0 when the covering coating of the reflex reflector has a refractive index of 1.5. It is very desirable to make a close approach to the optimum value, as the reflection brilliancy is much greater than can be obtained in the lower part of the range.

The leaching treatment serves to preferentially remove one or more of the component compounds of the glass composition. A preferred glass composition is one consisting of 29.6% of $Bi_2O_3$, 67.6% of PbO, 1.4% of $B_2O_3$, and 1.4% of $P_2O_5$. Glass beads formed thereof can be leached in dilute nitric acid solution to provide a porous surface layer of necessary thickness to cause the effective refractive index of the treated beads to be approximately 2.9 or even higher. The refractive index of the core glass (and of the beads prior to leaching) is approximately 2.4. The refractive index of the porous surface layer (having its pores filled with air) is approximately 1.5. The residual solid phase of the surface layer consists primarily of $Bi_2O_3$, the PbO having been largely leached out.

This leached type of surface layer is permeable to liquids of relatively low molecular weight (composed of relatively simple and small molecules), such as water and organic solvents. It is also permeable in substantial degree to non-volatile polymer molecules, such as, for example, film-forming coating materials, illustrated by natural and synthetic rubbers, cellulose esters and ethers, alkyd resins, phenol-aldehyde resins, etc. Hence when the glass beads are incorporated in coating compositions the original porous layer will become impregnated to some extent by a liquid phase which later sets up to a solid impregnant phase when the coating is dried or cured. Such materials have a refractive index of about 1.5 or less, and their presence within the porous structure will somewhat decrease the effective refractive index of the beads as compared to the effective refractive index when the pores are entirely air-filled. If solvent material is present in the coating composition, the liquid solvent may temporarily enter the interior recesses of the pores to which the polymer component does not penetrate, but upon drying of the coating composition the liquid solvent will migrate back into the coating composition, leaving only a vapor. Such vapors have a refractive index nearly the same as that of air (i. e., unity).

Fig. 3 shows a reflex reflector structure having an underlying base or backing 14, which may be rigid or flexible as desired, and which is coated on the front side with a pigmented reflective binder 15 in which is partially embedded a layer of small transparent glass beads 16 having a porous surface layer. These beads are of the type illustrated in Fig. 2 and just previously discussed, and have a very high effective refractive index (e. g. 2.9). A transparent covering coating 17 is applied over the beads and bonds to the porous surface layers thereof (which are at least partially impregnated by the coating composition) and to the intervening surfaces of the reflective binder; and it has a flat front (outer) face. This transparent covering coating has a low refractive index (e. g. 1.5) relative to that of the beads, and may be any suitable transparent coating material (e. g. an alkyd resin type of lacquer).

Assuming that the beads have the optimum effective refractive index, an incident bundle of paraxial light rays will be refracted in passing through any given bead and will be brought to a "focus" on the concave surface of the reflective binder which is in contact with the back portion of the bead. That is to say, the initially parallel rays of incident light will be converged in traveling to the reflective surface so as to form a bright disk thereon of minimum apparent diameter, and this may be termed a focal "point" since its diameter is very small compared to that of the bead. A true focal point cannot be obtained due to aberration effects.

This is illustrated in Fig. 3 by the rays (a) which are incident at zero angle (i. e. which strike the outer surface perpendicularly to the flat front), and by rays (b) which are incident at an angle. In the latter case the incident rays are refracted in entering the surface of the covering layer so as to reduce the angle of incidence to the underlying sphere. In either case, the cone of rays striking the underlying concave reflective surface at a focal "point" causes the reflective surface to emit a divergent cone of coaxial rays. If the reflective surface is highly specular, the emitted cone of rays will be approximately coextensive with the incident cone of rays and will be refracted in inverse fashion so as to provide a very brilliant cone of rays returning towards the light source, this cone having only a small divergency angle (the return of paraxial rays is prevented by the aberration of the lens system). A semi-specular metallic reflective surface, such as is provided by a reflective coating containing aluminum flake pigment, will cause increased divergency of the returning rays but the reflection brilliancy will still be very high as observed by a person who is near to the axis of the incoming light beam. A non-specular diffusing type of reflective surface (such as provided by a paint having a non-metallic pigment, e. g., titanium dioxide pigment) will cause a still greater divergency of the reflected rays, but the brilliancy will be much greater than in the case of an ordinary painted sign.

The returning rays from all of the beads of the reflex reflector structure merge to form a cone of light which travels towards the light source, so that a person off but near the axis of the beam of incident light will be within the brilliant cone of returning, reflex reflected, light, even though the beam of incident light approaches the reflector surface at an angle. The rays from the individual beads cannot be resolved by the eyes of the viewer (there being thousands of beads per square inch), and hence the reflector sheet appears to be continuously coated with brilliant paint over all areas which are provided with the underlying reflective coating.

When viewed by daylight (i. e. by incident light coming from various directions), the reflex reflector has at least as great visibility as it would have in the absence of the glass beads. The latter do not interfere with normal day viewing of the underlying reflective surface.

A brilliant color reflection effect can be obtained with the Fig. 3 structure by employing a silvery metallic reflective binder in combination with a colored transparent covering coating. Thus the reflective binder 15 can be pigmented with aluminum flake pigment. The flakes at the surface underlying each bead will tend to face the bead as the result of the embedding of the bead in the binder while it is still soft, before it has become dried and hardened. This makes for a brilliant, high-efficiency, reflection. The coloration of the transparent covering coating 17 can be effected by including a dye or, preferably, transparent color pigment. The well known phthalocyanine pigments are very effective. The refractive index of the transparent pigment particles is closely the same as that of the coating and this prevents appreciable light scattering. The colored covering coating functions as a filter for the light rays passing therethrough. Thus by including transparent red pigment in the covering coating, the reflector will appear to be red in color both by day and by night, and when viewed at night by the driver of an approaching vehicle it will have high visibility and a very brilliant red appearance.

The Fig. 3 structure can be employed to great advantage in improving the night visibility of vehicles travelling on highways to effect a major improvement in safety. In this case the body of the vehicle may be made reflex reflecting in whole or in substantial part by employing a painting technique which will result in the Fig. 3 structure. In this case the base 14 is the body of the vehicle. It is coated with an aluminum pigmented paint and while the latter is partially dried but still soft enough for partial embedding of the glass beads, the latter are projected against the paint layer, as by pouring or by means of an air gun, causing a packed mono-layer of the beads to become partially embedded. The paint layer is of appropriate thickness to only permit of forming a mono-layer of the beads, the surplus beads not adhering and falling off. The degree of embedding need not be as great as is shown in the drawing. After sufficient drying to firmly anchor the beads, a spray of the transparent covering coating composition is applied in sufficient amount to fill the interstices. After drying, a further amount of the latter is applied so as to fully cover over the beads and provide a flat, glossy, outer surface. By appropriate coloration of the covering coatings, or of the top covering coating only, any desired color appearance can be obtained, such as green, yellow, red, etc. The day appearance is just as attractive as though an ordinary colored lacquer had been applied. This procedure can be used even on high quality passenger automobiles. The night appearance is sensational. Since the coating has a smooth glossy outer surface it can be readily cleaned, polished, and waxed, as in the case of an ordinary lacquer. There are no exposed beads to collect dirt and dust.

The expedient just mentioned can be used in finishing the mud guards and other body parts of bicycles so as to thereby greatly increase the safety of night riding, but without interfering with the desired attractive appearance.

Referring now to Fig. 4, another specific embodiment of the invention is illustrated. This reflex reflector structure has a flat-surfaced back reflector 18 which may be a metal sheet having a reflective surface (such as a sheet of aluminum or of stainless steel), or a reflective metal foil, or a film containing reflective pigment, or a paper or film which has a reflective plating or coating or which has been reflectorized by deposition of aluminum vapor in a high vacuum. In any event, this back reflector has a smooth, flat surface. Upon this back reflector is applied a transparent binder coating 19 in which is partially embedded a layer of glass beads 21, which are of the type previously described, having a porous surface layer, and which have a very high effective refractive index. These beads are embedded so as to touch or closely approach contact with the reflective surface. A transparent covering coating 21 is applied over the beads and bonds to the porous surface layers thereof and to the intervening surfaces of the underlying transparent binder layer; and it has a flat front face. As before, this transparent covering coating has a low-refractive index (e. g. 1.5), relative to the very high effective refractive index of the beads (e. g. 2.9). This structure lacks the wide angularity property of the Fig. 3 structure owing to the fact that the beads are tangent to a flat reflective surface instead of being partially embedded in a reflective layer. Hence the reflex reflection brilliancy falls off rapidly as the angle of incidence is increased to substantial values. However, it has utility for some purposes which makes it desirable as, for example, in utilizing the types of reflective bases or backings mentioned above. The reflective surface underlying the beads can be a printed or painted sheet or base forming a sign, which is converted to a reflex reflecting type of sign by application of the beads and coatings to provide the Fig. 4 type of structure.

Fig. 5 shows a third type of reflex reflector structure, which is made by an inverse or up-side-down procedure. This structure can be made by starting with a transparent sheet or film which constitutes the flat-faced transparent top sheet 22 of the final product. With its front face down, the back surface (which is now up) is coated with a composition adapted to form a transparent binder coating 23 in which the layer of transparent glass beads 24 (of the Fig. 2 type) of very high effective refractive index (e. g. 2.9) is partially embedded and pressed so as to contact or closely approach the inner surface of the top sheet 22, followed by drying or setting-up to harden the binder. The refractive index of the transparent binder is relatively low (e. g. 1.5). The exposed extremities of the beads are then coated over with a reflective back coating 25 of any desired type, which provides a concave reflective surface in contact with the back surface of each bead, thereby providing the wide angularity property previously mentioned. This coating need not be uniform. The beaded surface can be printed or painted to provide the insignia and background areas of a sign. Very brilliant reflection can be obtained by depositing a metal coating on the beaded surface (which can first be given a very thin transparent sizing coating to seal over the pores of the beads, if desired) to form the reflective back coating 25. The transparent top sheet 22 can include a dye or transparent color pigment so as to provide coloration.

Having described the principles of the present invention, the following further description is given of preferred illustrative embodiments of the novel glass beads and of techniques for making them, but without intent to be limited thereto.

*Glass bead compositions*

The presently preferred composition of the glass from which the beads are made may be broadly characterized as being of the lead-bismuth type, primarily consisting of bismuth oxide ($Bi_2O_3$) and lead oxide ($PbO$) with each present in substantial proportion, and so composed that the refractive index of the glass exceeds 2.0. The glass may contain minor proportions of thallium oxide ($Tl_2O_3$), tungsten oxide ($WO_3$), and tantalum oxide ($Ta_2O_5$), which to a certain extent are functional equivalents of the bismuth and lead oxides; and of this group $WO_3$ is preferred. The glass preferably should contain a small proportion (e. g. 1 to 15%) of one or more "glass-forming" oxides of the group: boron oxide ($B_2O_3$), silica ($SiO_2$), phosphorous pentoxide ($P_2O_5$), and germanium oxide ($GeO_2$), which provide desirable additional cross-bonding between other components of the mixture. The glass should contain a small proportion (e. g. 1 to 15%) of one or more oxides adapted to promote the subsequent differential leaching out of lead oxide; these oxides are phosphorous pentoxide ($P_2O_5$), which is preferred, and arsenic oxide ($As_2O_3$), antimony oxide ($Sb_2O_3$), tungsten oxide ($WO_3$) and vanadium oxide ($V_2O_5$). Of these it will be noted that $WO_3$ also comes within the earlier mentioned optional group of oxides, and that the $P_2O_5$ also comes within the mentioned group of glass-forming oxides, and hence they are multi-functional.

The most preferred compositions may be further and more specifically characterized as consisting of 20 to 45% $Bi_2O_3$ and sufficient $PbO$ to make the sum thereof at least 90%, and at least about 1% each of $B_2O_3$ and $P_2O_5$. The $B_2O_3$ serves as a glass-forming oxide and the $P_2O_5$ serves both as a glass-forming oxide and as an oxide which promotes the desired leaching action. A very desirable glass composition of this type consists of 29.6% of $Bi_2O_3$, 67.6% of $PbO$, 1.4% of $B_2O_3$ and 1.4% of $P_2O_5$, all parts being by weight. This glass can be formed into glass beads which have an original refractive index of about 2.4, and which can be leached to produce glass beads having an effective refractive index as high as 2.9 or even higher (depending upon the extent of leaching).

A further illustration of a specific glass composition is one consisting of $Bi_2O_3$ and $PbO$ in the weight ratio of 3:7, the balance being 4 to 8% of $SiO_2$ and 10 to 15% of $WO_3$. Glass beads formed of this composition have an initial refractive index of 2.25 to 2.35 which can readily be increased by leaching to provide an effective refractive index of 2.6 to 2.75.

In these compositions, the amounts of materials are given on the basis of the oxides shown, which are presumptively present in the finished glass. Compounds other than oxides may be added to the original charge, in amount calculated to provide the desired amount of the oxide.

The above type of glass should be melted in crucibles or pots which are not attacked by the glass and do not cause any change in the composition thereof. Silver crucibles and unglazed porcelain crucibles have proved satisfactory for laboratory batches. The ordinary clay pots employed in the glass industry should be avoided. For large scale commercial batches, use can be made of electrocast refractories.

These glass compositions are low-melting and melt to a very free-flowing state. Glass beads in the desired diameter range of 1 to 10 mils or smaller can be made by fusing particles of glass cullet which are blown or dropped through a high temperature flame or a radiant heating zone to soften them sufficiently to form transparent sphericles by the action of surface tension while moving through air, followed by rapid cooling to harden the beads without devitrification. The cullet can be made by quenching a stream of molten glass in water.

Glass beads of the bismuth-lead type are broadly described and claimed in the copending application of W. R.

Beck and myself, S. N. 56,055, filed on October 22, 1948 and since abandoned in favor of continuation-in-part application S. N. 251,128, filed October 12, 1951.

Glass bead leaching procedure

Extensive studies on the leaching of glass beads of the bismuth-lead type, described above, have led to the following conclusions:

The most satisfactory leaching agent is dilute nitric acid in the range of 0.01 N to 0.05 N. A slow leaching is superior to a fast leaching. Factors governing the rate are the temperature, the pH value (acid strength), the amount of acid relative to the weight of the beads, and the degree of agitation of the bead-acid mixture.

The leaching action is primarily due to selective reaction with the lead component of the glass. In the initial phase of the leaching, the activation energy needed to remove the lead ions from their positions in the glassy network is the dominant factor. Shortly, however, other factors, such as the diffusion of the lead ions out to the solution, play influential roles, since the curve of time vs. effective refractive index becomes essentially a straight line and continues as such until the acid becomes exhausted. Thorough washing of the leached beads is quite important.

Leaching can be effected either by batch or by continuous procedures.

The following experimental example illustrates a convenient small-scale batch procedure:

The glass beads were of 270–325 mesh size (diameter range of 1 to 2 mils) made from the previously mentioned preferred glass consisting of 29.6% $Bi_2O_3$, 67.6% PbO, 1.4% $B_2O_3$ and 1.4% $P_2O_5$. They had a refractive index (prior to leaching) of 2.43. The beads were leached in a 5 gallon glass (Pyrex) jar and agitation was provided by rolling the jar on a rolling mill.

The jar was charged with 19.5 liters of 0.035 N nitric acid and 136 grams of the glass beads, all at room temperature, and was tightly stoppered and put on the mill to roll. Rolling at the rate of 400 R. P. M. was continued for 60 minutes at room temperature. The jar was then removed and opened, the acid liquor was drained off, and the beads were well rinsed three times, using distilled water, the third rinse being with hot water. Then 8 liters of hot water was placed in the jar and it was put on the roller mill, the opening being small enough to keep the water and beads from flowing out. A steam line was inserted in the open end of the jar and into the water and sufficient steam was introduced to keep the water at its boiling point. Washing was continued for 8 minutes. The beads and wash water were then run into a Buechner vacuum filter and the beads left until damp dry. The beads were then heated in an oven at about 200° F. until thoroughly dry.

This procedure resulted in finished leached beads having an effective refractive index of approximately 2.9 when embedded in a transparent binder coating having a refractive index of approximately 1.5. This is an average value, as the beads which are larger than average have effective refractive indices which are lower than those of the beads of smaller than average size, due to the differing ratios of porous layer thickness to core diameter. The mentioned value is somewhat less than the value for the beads when the porous layer is air-filled, but the values are of the same order. Examination indicated that the residual solid phase of the porous surface layer consisted mainly of $Bi_2O_3$ and that it had a thickness on the average of approximately 23% of the total bead radius (i. e., 15% of the core diameter). The porous layer (air-filled) had a bulk refractive index of 1.48 as compared to 2.43 for the unleached glass, and its bulk density was 55% of that of the unleached glass. The estimated pore volume of the layer was 60% of the total volume of the layer. The pores were of submicroscopic size and caused no scattering whatever of light rays passing through the transparent beads. This indicated that the dimensions of the pores were smaller than the wave length of light, the pores forming a three-dimensional network which permeates the residual solid phase.

These beads were used in making up reflex reflectors as previously described. There was no darkening of the beads even after prolonged outdoor exposure (i. e. no "solarization" was caused by long exposure to the actinic rays of the sun). The beads were found to be suitable for weatherproof reflex reflector structures adapted for extended outdoor use.

Having disclosed various embodiments of my invention for the purposes of illustration, but not of limitation, what I claim is as follows:

1. A glass bead that is a transparent two-element sphere-lens having a diameter not exceeding 10 mils and adapted for use in reflex light reflectors of the character described, formed of a glass sphere initially having a refractive index exceeding 2.0 and composed largely of lead and bismuth oxides with the bismuth oxide in the proportion of 20 to 45% and also including a small proportion of at least one oxide of the group consisting of phosphorous pentoxide, arsenic oxide, antimony oxide, tungsten oxide and vanadium oxide, the outer portion of the sphere having been leached to selectively extract lead oxide and leave a submicroscopically porous solid surface layer consisting mainly of bismuth oxide which provides an integral concentric layer that is optically homogeneous and has a substantial thickness that is a minor but plural-percent fraction of the diameter of the residual unleached glass core, the core and the layer both serving as transparent spherical lens element of the composite sphere-lens.

2. A reflex light reflector of the type described, characterized by having a layer of glass beads as defined in claim 1, the beads being imbedded in a coating layer that impregnates the porous surface layers of the beads.

3. A glass bead that is a transparent two-element sphere-lens having a diameter not exceeding 10 mils and adapted for use in reflex light reflectors of the character described, formed of a glass sphere initially having a refractive index exceeding 2.0 and composed essentially of 20 to 45% $Bi_2O_3$ and sufficient PbO to make the sum thereof at least 90% and also containing at least 1% each of $B_2O_3$ and $P_2O_5$, the outer portion of the sphere having been leached to selectively extract lead oxide and leave a submicroscopically porous solid surface layer consisting mainly of bismuth oxide which provides an integral concentric layer that is optically homogeneous and has a substantial thickness that a minor but plural-percent fraction of the diameter of the residual unleached glass core, the core and the layer both serving as transparent spherical lens elements of the composite sphere-lens.

4. A reflex light reflector of the type described, characterized by having a layer of glass beads as defined in claim 3, the beads being embedded in a coating layer that impregnates the porous surface layers of the beads.

References Cited in the file of this patent

UNITED STATES PATENTS

| Number | Name | Date |
|---|---|---|
| Re. 19,070 | Chretien | Feb. 6, 1934 |
| 1,044,135 | Buechner | Nov. 12, 1912 |
| 2,113,380 | Nichols | Apr. 5, 1938 |
| 2,348,704 | Adams | May 16, 1944 |
| 2,379,702 | Gebhard | July 3, 1945 |
| 2,379,741 | Palmquist | July 3, 1945 |
| 2,407,680 | Palmquist et al. | Sept. 17, 1946 |
| 2,415,703 | Nicoll | Feb. 11, 1947 |
| 2,426,541 | Williams | Aug. 26, 1947 |
| 2,490,662 | Thomsen | Dec. 6, 1949 |
| 2,491,761 | Parker et al. | Dec. 20, 1949 |
| 2,500,801 | Church | Mar. 14, 1950 |
| 2,511,517 | Spiegel | June 13, 1950 |